United States Patent
Kabana et al.

[15] 3,705,288
[45] Dec. 5, 1972

[54] BUTT WELDER FOR FINE GAUGE TUNGSTEN/RHENIUM THERMOCOUPLE WIRE

[72] Inventors: Walter P. Kabana; Charles B. King, both of Hampton, Va.

[73] Assignee: The United States of America as represented by the Administrator of the National Aeronautics and Space Administration

[22] Filed: Dec. 31, 1970

[21] Appl. No.: 103,230

[52] U.S. Cl..................219/101, 29/203 V, 219/119
[51] Int. Cl. ..............................................B23k 9/02
[58] Field of Search.....219/101, 109, 119; 29/203 V; 269/21

[56] References Cited

UNITED STATES PATENTS

| | | |
|---|---|---|
| 3,384,731 | 5/1968 | Draving.................219/104 X |
| 3,004,766 | 10/1961 | Bryant....................29/203 V |
| 2,477,319 | 7/1949 | Talbot......................219/101 |
| 3,065,536 | 11/1962 | Chapman...............219/101 X |
| 2,967,925 | 1/1961 | Rietsch..................219/101 X |

Primary Examiner—J. V. Truhe
Assistant Examiner—Gale R. Peterson
Attorney—Howard J. Osborn and John R. Manning

[57] ABSTRACT

An electrical resistance butt welder for welding fine wire or other metal parts having small cross sections through the use of a vacuum groove and bow-shaped electrodes to hold the wires alined and abutted.

7 Claims, 3 Drawing Figures

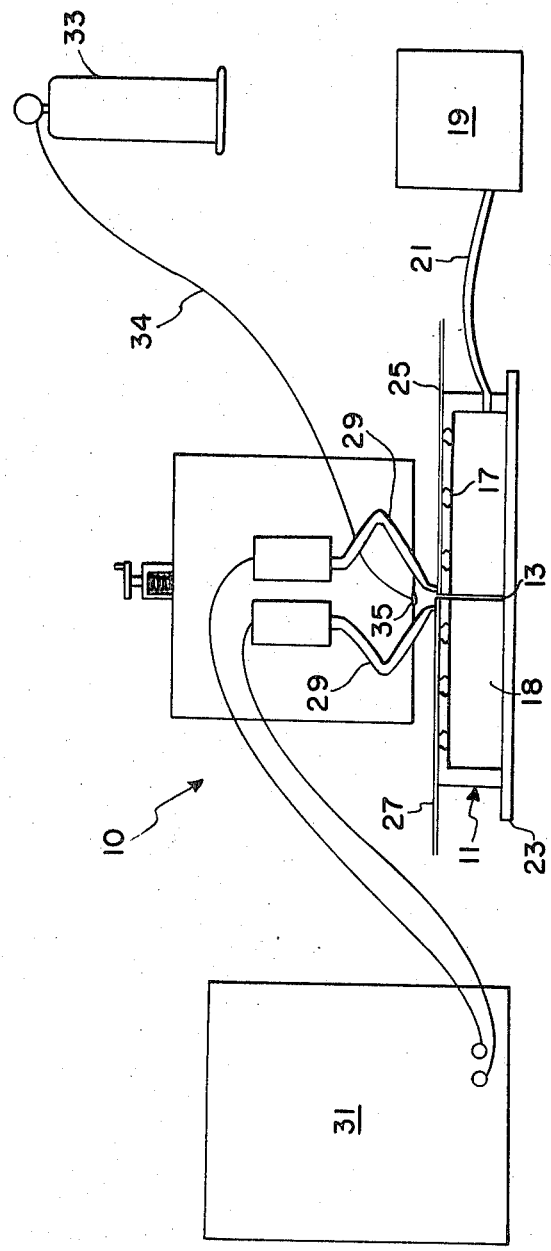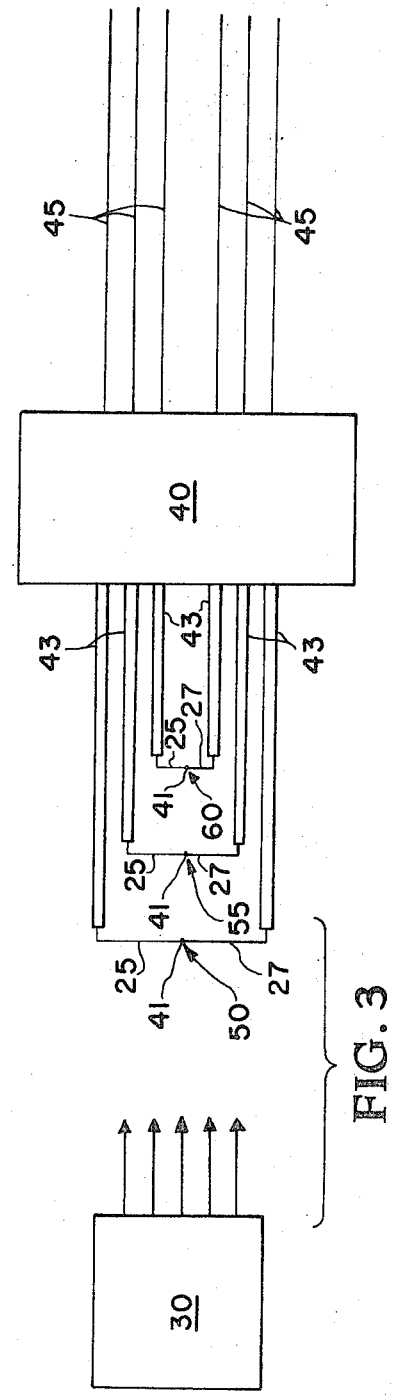

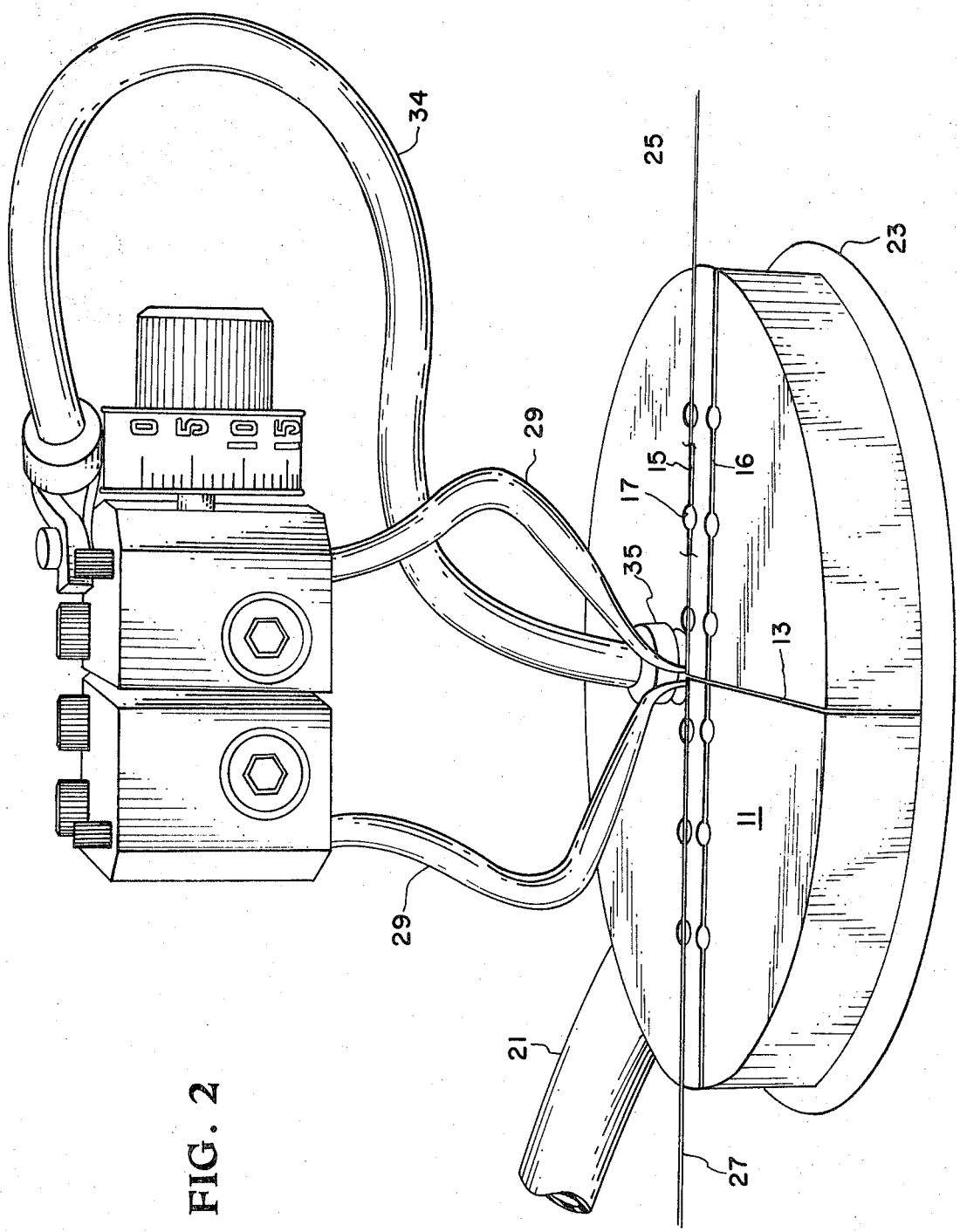

BUTT WELDER FOR FINE GAUGE TUNGSTEN/RHENIUM THERMOCOUPLE WIRE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to an electrical resistance butt welder and more particularly to a welder which is used for precision butt welding of fine gage wires. Thermocouples which are extremely sensitive to temperature change may be constructed by butt welding fine gage tungsten/rhenium thermocouple wire. A requirement of even temperature distribution along the welded wire prohibits a weld junction diameter which is larger than the diameter of the wire. Since the wires are arranged so as to be equidistant from the heat source in the ordinary temperature sensing application, the welded junction must not only be of the same diameter as the joined wires but must also produce a straight wire. The two wires butt welded in straight-line fashion may be arrayed in a plane perpendicular to the radiated heat. With the two wires and the butt junction in the same plane, neither wire or weld will act as a heat sink because a portion of both wires will see the same temperature as the junction. Since the butt welded junction is often brittle, it is essential that the wires be very straight and alined at the completion of the weld. Tungsten/rhenium thermocouples were formerly joined by tungsten insert gas, plasma needle flame or lap resistance weld. Although the wires were adequately joined by such methods the resultant weld junction would approximately double the diameter of the wires and did not result in alinement of the wires in a straight line at the weld. Abrasive dressing of the weld junction did not prove successful.

SUMMARY OF THE INVENTION

The present invention includes a vacuum chuck which is constructed of two parts which are bonded together by an electrically insulating epoxy layer. A straight groove in the surface of the chuck shaped to receive the wires to be welded extends across the chuck approximately perpendicular to the bond line. Orifices at the bottom of this groove lead to the interior of the chuck which is evacuated by a vacuum pump. Two fine gage wires which are to be butt welded are laid in the groove and butted together at the insulated bond line. The two wires are held in alinement and abutment by the force of the vacuum acting through the orifices. Two bow-shaped copper electrodes are lowered to touch each wire at a certain distance from the bond line. As the electrodes are pressed against the wire, the bow-shape of these electrodes produces forces which tend to press the ends of the wires together and hold them in abutment. Wire alinement and abutment is checked through a binocular microscope. Current from a power supply is pulsed through the electrodes. Due to the insulating bond line, the only path that this current can take is through the butted ends of the wire. A fusion weld is formed at the butt juncture due to maximum electrical resistance heating at the point of contact between the wire ends. An inert gas is directed at the weld area during the welding operation through a small diameter tube to prevent oxidation of the junction.

Accordingly, it is an object of the present invention to provide a precision butt welder for welding fine gage wire wherein the wire cross section at the weld junction is equal to or slightly less than the diameter of the wire and the welded unit forms a straight line for some distance from the weld junction. Another object of the present invention is to produce a precision butt welder which is inexpensively constructed and operated and may be used for joining fine gage weldable wires of various diameters.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein:

FIG. 1 is a side elevational view, partly in section, with some elements shown diagramatically, of the novel welder;

FIG. 2 is a perspective view of the welder showing the wires in position for welding;

FIG. 3 is a perspective view of a temperature sensor using the butt welded fine gage wire thermocouples produced by the novel butt welder.

DESCRIPTION OF THE PREFERRED EMBODIMENT

Referring now more particularly to the drawings wherein like numerals designate identical parts throughout the several views, and more particularly to FIG. 1, there is shown a butt welder 10 which includes a vacuum chuck 11. Vacuum chuck 11 consists of two steel, copper or other metal halves which are bonded together along a 0.010-inch thick bond line 13 by an electrically nonconducting adhesive such as Epon 934 adhesive manufactured by the Shell Oil Corporation and serving as an electrical insulator between the two halves. A straight groove 15 (FIG. 2) traverses the surface of vacuum chuck 11 approximately perpendicular to bond line 13. Groove 15 is shaped to receive the wires to be butt welded, the width of groove 15 being approximately the diameter of the wires to be welded and the depth of groove 15 being approximately equal to the radius of the wires to be welded. Vacuum ports 17 (shown exaggerated for clarity) are drilled at regular intervals along the bottom of groove 15 passing into an internal cavity 18 of vacuum chuck 11. Internal cavity 18 is partially evacuated by vacuum pump 19 through line 21. Vacuum chuck 11 rests on base 23 which is constructed of a nonconducting material. A tungsten/26 percent rhenium wire 25 is abutted against a tungsten/5 percent rhenium wire 27 for welding. A source of argon gas 33 is located near the welder. A gas line 34 leads from the source 33 to a nozzle 35 which is directed at the weld area.

Referring now to FIG. 2, a novel butt welder is shown in perspective with a portion of wire 27 cut away to show groove 15 and vacuum port 17. Grooves of different sizes such as groove 16 may be constructed to allow butt welding of several different sizes of wire. FIG. 3 shows a thermocouple application of the fine gage wire which may be butt welded using the novel welder. Three thermocouples 50, 55 and 60 are shown implanted in a plug 40. Plug 40 may be inserted into a structure made of identical material being affected by a source of heat 30. These thermocouples are displayed at varying distances from heat source 30 such that the plane of the wires 25 and 27 making up the thermocouple as well as the weld junctions 41 are perpendicular to the heat emanating from the source 30. The straightness of the wires 25 and 27 across the weld junctions 41 and the approximately constant thermocouple cross-section enable a high degree of accuracy of the temperature profile through the test material by electrical readout through thermocouple leads 45.

OPERATION

The operation of the present invention is now believed apparent. Wires 25 and 27 to be welded are placed in groove 15 of vacuum chuck 11 and butted together at bond line 13. Vacuum pump 19 partially evacuates the hollow cavity 18 through vacuum line 21. Wires 25 and 27 are held in position in groove 15 by the force of this partial vacuum acting through vacuum port 17. The bow-shaped copper electrodes 29 are positioned and lowered to touch the wires 25 and 27 at a distance of about 0.010 inch on each side of the butted ends. The butted ends of the wires to be welded are centered over the bond line 13. As the electrodes 29 are lowered upon the wires 25 and 27, the shape of the electrodes results in a component of force against wires 25 and 27 which will hold them in abutment. Current from power supply 31 is pulsed through the electrodes 29. Since the bond line 13 and base 23 are electrical insulators, the only path through which the current may pass is the abutted wires 25 and 27. The electrical resistance at the butted ends of the tungsten/rhenium wires to the current pulse causes a weld to be formed at approximately 5,800° F. Argon gas from source 33 flows through line 34 and is directed upon the weld during the welding operation to create an inert gaseous environment. A binocular microscope (not shown) is used to check the alinement and abutment of the wires 25 and 27 prior to welding. The resultant weld junction will be approximately the same diameter as the wire which may be as small as 1 or 2 mils in diameter. It is thus seen that the present invention produces butt welds having a weld junction approximately the same diameter as the wire and joins the two wires in a straight line.

Although the invention has been described and illustrated in detail in a specific embodiment thereof, it is to be understood that this description is by way of illustration only and is not to be taken as limiting on the applicants' invention. Obviously, there are many modifications of the present invention possible in the light of the aboveteachings. Many different bonding agents and the base materials may be used provided they are electrical nonconductors. Vacuum chucks made of stainless steel and oxygen free copper have been used successfully. Vacuum chucks may be equipped with several grooves of different sizes to accommodate fine wire of different diameter or made without grooves. By shaping the groove accordingly, thin sheets may be butt welded and fine wire may be butt welded to thin sheets. The angularity of the grooves at the bond line may be arranged so that wires may be butt welded perpendicular to one another or at other desired angles. Although tungsten/rhenium wire was specified, any fine gage weldable wire can be butt welded with the use of this novel welder.

The vacuum chuck serves as a thermal quenching method for the wire during the weld phase limiting the wire heating to a localized region, thereby minimizing mechanical upset of the wire ends.

The bow-shaped copper electrodes impart a toeing-in-force at the electrode tips to provide abutment of the wire ends providing a high resistance current path which results in resistance heating at the juncture. As the wires become molten, abutment forces allow continued followup movement of the wires to assure consolidation of the fusion zone of the wires. The downward imparted electrode force maintains mechanical contact of the wire with the vacuum chuck thus assuring removal of unwanted heat and consequent wire distortion. Therefore the bow-shaped electrodes provide means of mechanical positioning and wire axial alinement, forge upset forces to form complete filling of the weld zone, provide a current flow path having position repeatability features and maintain a calibrated downward acting force to maintain controlled contact with the thermal sink (chuck).

The ends of the fine gage wires can be prepared by a variety of means. Careful alinement and matching of the wire ends will assure repeatable quality welds.

What is claimed as new and desired to be secured by Letters Patent of the United States is:

1. An electrical resistance butt welder for joining metals of small cross section comprising:
   parts to be welded which are butted together at a weld line;
   vacuum chuck means for positioning and holding said parts to be welded and consisting of two parts separated electrically along said weld line by an electrically non-conducting solid material, said vacuum chuck means including at least one groove for continuously supporting the parts and shaped in cross section to receive said parts to be welded whereby said parts to be welded are alined for welding when placed in said groove; butt welders means including electrode means for welding said parts to be welded.

2. The butt welder of claim 1 wherein said vacuum chuck means includes orifices adjacent to and along the length of said parts to be welded, said orifices being connected to a vacuum source whereby said parts to be welded are held in position for welding by vacuum.

3. The butt welder of claim 1 wherein the vacuum chuck means includes two metal half shells bonded together along said weld line by an electrically nonconducting solid adhesive of sufficient thickness to insulate said half shells one from the other, said half shells having at least one groove in each of their surfaces, said grooves meeting at said solid adhesive forming at least one continuous groove, said groove being provided with orifices connected to a vacuum source whereby the parts to be welded are held in said groove by vacuum.

4. The butt welder of claim 3 wherein the vacuum chuck half shells are constructed of oxygen-free copper.

5. The butt welder of claim 1 wherein the electrode means includes two bow-shaped members which are pressed into contact with said parts to be welded on either side of said weld line whereby the contact pressure causes further bowing of the bow-shaped members and a toeing-in of the electrode tips forcing together said parts to be welded and holding said parts in abutment during fusion, thereby preventing arcing and burnout of said parts to be welded.

6. The buttwelder of claim 3 including a tube for directing a stream of inert gas at the weld area during welding and wherein said electrode means includes two bow-shaped members which are pressed into contact with said parts to be welded on either side of said weld line at a fixed interval whereby the contact pressure serves to force together said parts to be welded and to hold said parts to be welded in abutment.

7. The butt welder of claim 1 wherein the vacuum chuck means includes a plurality of grooves of different cross section to accommodate pairs of parts to be welded of similar cross section whereby different diameter wires may be butt welded and whereby other thin metals may be butt welded.

* * * * *